US011259058B2

United States Patent
Goldrei et al.

(10) Patent No.: US 11,259,058 B2
(45) Date of Patent: Feb. 22, 2022

(54) USE OF RENDERED MEDIA TO ASSESS DELAYS IN MEDIA DISTRIBUTION SYSTEMS

(71) Applicant: Apple Inc., Cupertino, CA (US)

(72) Inventors: Simon Goldrei, San Francisco, CA (US); Steven E. Saunders, Cupertino, CA (US); Roger N. Pantos, Cupertino, CA (US); John Matienzo, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/814,278

(22) Filed: Mar. 10, 2020

(65) Prior Publication Data

US 2020/0314467 A1 Oct. 1, 2020

Related U.S. Application Data

(60) Provisional application No. 62/823,308, filed on Mar. 25, 2019.

(51) Int. Cl.
*H04N 7/173* (2011.01)
*H04N 21/2389* (2011.01)
(Continued)

(52) U.S. Cl.
CPC ... *H04N 21/23892* (2013.01); *H04N 21/2187* (2013.01); *H04N 21/2335* (2013.01); *H04N 21/23418* (2013.01); *H04N 21/2402* (2013.01); *H04N 21/8358* (2013.01); *H04N 21/8456* (2013.01)

(58) Field of Classification Search
CPC ........ H04N 21/23892; H04N 21/2402; H04N 21/2187; H04N 21/8456; H04N 21/23418; H04N 21/2335; H04N 21/8358; H04N 21/4223; H04N 21/42203;
(Continued)

(56) References Cited

U.S. PATENT DOCUMENTS 5,487,092 A * 1/1996 Finney ............... H04L 7/02
375/354
6,108,782 A * 8/2000 Fletcher .............. G06F 8/65
370/245

(Continued)

OTHER PUBLICATIONS

Haouzia et al. "Methods for Image Authentication: A Survey", Multimedia t~Tools and Applications, vol. 39, No. 1 (2008), pp. 1-46.

(Continued)

*Primary Examiner* — Michael B. Pierorazio
(74) *Attorney, Agent, or Firm* — BakerHostetler (57) ABSTRACT

Techniques are disclosed for measuring propagation delay of a media distribution system based on content output by rendering devices. An output from an output device of the media distribution system may be captured and a token may be detected from the captured content. A timecode may be derived from the detected token. The system's propagation delay may be determined from the derived timecode and may provide a basis to analyze system delays and other processing artifacts. In this manner, propagation artifacts may be estimated between multiple rendering devices that lack controls to synchronize their operation.

22 Claims, 6 Drawing Sheets

(51) Int. Cl.
*H04N 21/24* (2011.01)
*H04N 21/2187* (2011.01)
*H04N 21/845* (2011.01)
*H04N 21/234* (2011.01)
*H04N 21/233* (2011.01)
*H04N 21/8358* (2011.01)

(58) Field of Classification Search
CPC ......... H04N 21/44209; H04N 21/4341; H04N 21/2368; H04N 21/4307
USPC .......................................................... 725/116
See application file for complete search history.

(56) References Cited

U.S. PATENT DOCUMENTS

| | | | | |
|---|---|---|---|---|
| 6,907,041 | B1* | 6/2005 | Turner | H04L 12/5601 370/388 |
| 7,134,035 | B2* | 11/2006 | Sharma | G06F 1/12 713/500 |
| 7,424,080 | B1* | 9/2008 | Liu | H04J 3/0632 348/E5.003 |
| 8,290,423 | B2* | 10/2012 | Wang | G10L 25/51 455/2.01 |
| 8,923,141 | B2* | 12/2014 | Bryant | H04J 3/0679 370/252 |
| 9,058,135 | B1* | 6/2015 | Schumacher | G06F 1/10 |
| 2002/0059535 | A1* | 5/2002 | Bekritsky | H04B 7/2687 713/400 |
| 2006/0195780 | A1* | 8/2006 | Zuccolotto | G06F 40/18 715/273 |
| 2006/0203851 | A1* | 9/2006 | Eidson | H04J 3/0667 370/503 |
| 2007/0124756 | A1* | 5/2007 | Covell | H04N 21/8106 725/18 |
| 2007/0297799 | A1* | 12/2007 | Tse-Au | H04Q 11/0005 398/58 |
| 2008/0069150 | A1* | 3/2008 | Badt | H04J 3/0667 370/503 |
| 2008/0082510 | A1* | 4/2008 | Wang | H04H 60/40 |
| 2010/0085989 | A1* | 4/2010 | Belhadj | H04J 3/0667 370/503 |
| 2010/0135314 | A1* | 6/2010 | Fourcand | H04J 3/1611 370/419 |
| 2010/0272102 | A1* | 10/2010 | Kobayashi | H04N 21/4305 370/389 |
| 2011/0164625 | A1* | 7/2011 | Fourcand | H04J 3/0667 370/498 |
| 2011/0202967 | A1* | 8/2011 | Hecht | H04N 21/854 725/114 |
| 2011/0286442 | A1* | 11/2011 | Maurice | H04W 56/0015 370/350 |
| 2011/0317991 | A1* | 12/2011 | Tsai | G03B 9/70 396/180 |
| 2012/0249806 | A1* | 10/2012 | Gong | H04N 5/23206 348/207.1 |
| 2012/0250704 | A1* | 10/2012 | Yamada | H04L 43/0858 370/503 |
| 2012/0284434 | A1* | 11/2012 | Warren | G06F 13/00 710/22 |
| 2012/0331026 | A1* | 12/2012 | Menkhoff | H03H 17/028 708/300 |
| 2013/0103861 | A1* | 4/2013 | Ahn | H04W 52/0261 710/14 |
| 2013/0185374 | A1* | 7/2013 | Fukasawa | H04L 69/28 709/208 |
| 2013/0194496 | A1* | 8/2013 | Atherton | H04N 21/4307 348/515 |
| 2013/0215753 | A1* | 8/2013 | Le Pallec | H04J 3/0667 370/235 |
| 2014/0150021 | A1* | 5/2014 | Subramanian | H04N 21/812 725/36 |
| 2014/0165085 | A1* | 6/2014 | Karacali-Akyamac | H04N 21/4788 725/14 |
| 2014/0196077 | A1* | 7/2014 | Gordon | H04N 21/2347 725/31 |
| 2019/0058929 | A1* | 2/2019 | Young | H04N 21/233 |
| 2020/0314467 | A1* | 10/2020 | Goldrei | H04N 21/4223 |

OTHER PUBLICATIONS

Petitcolas et al., "Information hiding-a survey", Proceedings of the IEEE87, No. 7 (1999), pp. 1062-1078.
Potdar et al., "A Survey of Digital Image Watermarking Techniques", In INDIN'05. 2005 3rd IEEE International Conference on Industrial Informatics, 2005., pp. 709-716.

* cited by examiner

USE OF RENDERED MEDIA TO ASSESS DELAYS IN MEDIA DISTRIBUTION SYSTEMS

CROSS REFERENCE TO RELATED APPLICATION

This application claims the benefit of U.S. Provisional Application No. 62/823,308 filed on Mar. 25, 2019, the disclosure of which is incorporated by reference herein.

BACKGROUND

The present disclosure is directed to techniques for assessing performance of media distribution systems.

Media distribution systems have become familiar to consumers of online content. Typically, they involve streaming of audio content, visual content (often, both) from a source device to a rendering device over a network such as the Internet. Although streamed content often have timestamps inserted by audio and video coding protocols, there are a wide variety of rendering environments in which the timestamps are not honored all the way through to audio and video rendering. It can occur that delays in a rendering pipeline for one element of media content may be different than for another media content, which causes the different content elements to be output at different times and causes consumers to perceive an error in rendering. Moreover, the disparity among different rendering environments can create impediments to diagnostic techniques that attempt to quantify such errors.

Even in portions of a media distribution system where coding timestamps are honored, processing events can impair performance of the distribution system. For example, processing stages imposed by content coding algorithms and distribution elements can lead to delays in rendering at end points of a distribution system. Video data that should be perceived as "live" may not be so accepted if undue processing delays occur. Other processing phenomena may arise that cause video frames to be lost. Diagnostic techniques would be enhanced if performance of the distribution system could be measured based on video data at the time it is output from a display device (colloquially, "at the glass") rather than at some intermediate location within a system that may not account for all sources of processing delays or other errors.

DETAILED DESCRIPTION

The present disclosure describes techniques for measuring propagation delay of a media distribution system based on content output by rendering devices. An output from an output device of the media distribution system may be captured and a token may be detected from the captured content. A timecode may be derived from the detected token. The system's propagation delay may be determined from the derived timecode and may provide a basis to analyze system delays and other processing artifacts. In this manner, propagation artifacts may be estimated between multiple rendering devices that lack controls to synchronize their operation.

Figure 1:
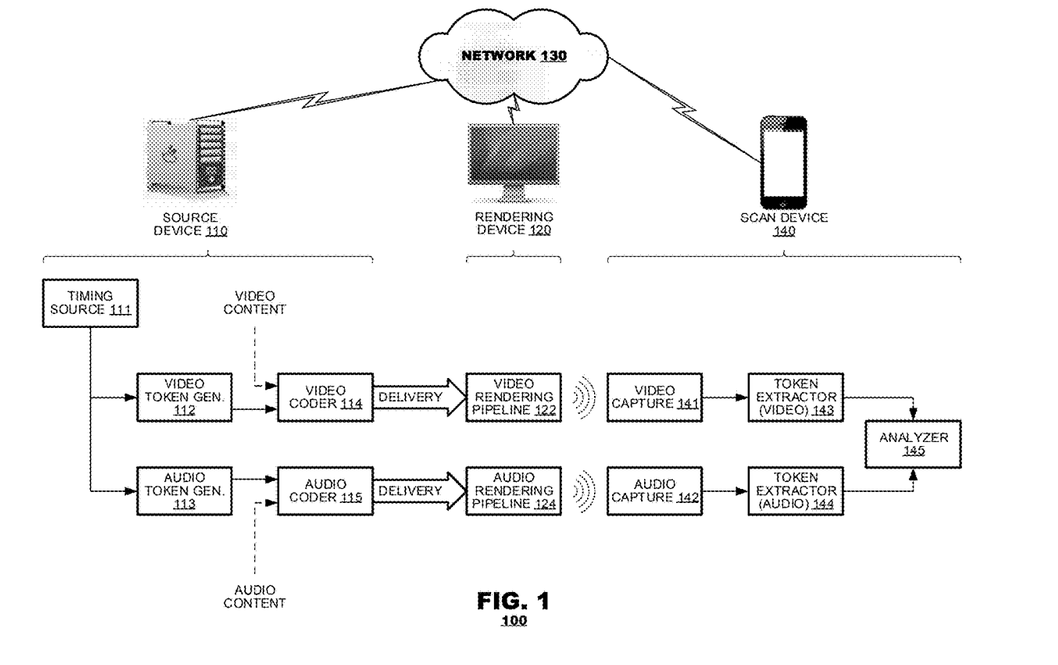
FIG. 1 illustrates data flow diagram, according to aspects of the present disclosure.

FIG. 1 is a data flow diagram illustrating a system 100 according to an aspect of the present disclosure. The system 100 may include a source device 110 ("source") and a rendering device 120 provided in mutual communication via one or more communication networks 130. A scan device 140 may be provided in sufficient proximity to the rendering device 120 to capture audio and video output from the rendering device 120. The system 100 may be arranged to measure timing of audio and video information as it progresses through the system 100, from the source device 110 through to the "glass" of the rendering device 120. That is, the system 100 may capture timing information of audio and video signals as it is rendered on output devices (not shown) of the rendering device 120.

The system 100 may include several processing stages. [At the source 110, the system 100 may include a shared source 111 of timing information, a video token generator 112 and an audio token generator 113, each of which generates tokens from common timing information. The source 110 also may include a video coder 114 that generates video data from the token, and an audio coder 115 that generates audio data from the token. In some aspects, audio and video tokens may be integrated with other audio content and video content, respectively, but this need not occur in all cases. The resultant coded audio data and coded video data may be output from the source 110 to a network 130 for delivery to a rendering device 120.

The rendering device 120 may have rendering pipelines 122, 124 for video data and audio data, respectively. The video rendering pipeline 122 may receive coded video from the source 110, decode it, and display it on a display device such as an LCD screen (stages not shown). Similarly, the audio rendering pipeline 124 may receive coded audio from the source 110, decode it, and output it to speaker devices (also not shown). Thus, the rendering device 120 may output video content that contains the video tokens and it may output audio content that contains the audio tokens.

Although FIG. 1 illustrates a rendering device 120 as a single, contained unit, in practice, rendering devices may be far more complex. For example, in other common rendering applications, rendering may be performed by a multi-component arrangement of rendering devices including for example, a micro-console media player (such as the popular Apple TV) coupled to a high definition display device and one or more speaker devices. Each component device may perform their own signal conditioning operations on the media that it receives in a manner that is uncorrelated to signal conditioning operations that may be performed by other devices and which may impart a component-specific delay on propagation of content as it progresses through the rendering devices. Thus, where a micro-console may output audio and video content to other component devices in a correlated fashion, the component devices may perform additional processing operations that disrupt the correlation created by the micro-console. And, of course, rendering devices may differ from each other from installation to installation, which causes delays to vary from consumer case to consumer case.

The scanning device 140 may include a video capture system 141, an audio capture system 142, and token extractors 143, 144 for video and audio, respectively. The video capture system 141 may capture video content output by the rendering device 120, which includes the video content representing tokens contained therein. Similarly, the audio capture system 142 may capture audio content output by the rendering device 120, which includes the audio content representing tokens contained therein. The token extractors 143, 144 may extract timing information from token information contained within the captured video content and the captured audio content, and it may output the extracted timing information to an analyzer 145 within the scan device 140.

Typically, the source device 110 and the rendering device 120 may have runtime applications involving distribution of audio/visual content. For example, such applications' processes may be employed in coding, delivery, decoding and rendering of live media content. Aspects disclosed herein may be employed in diagnostic modes of operation of the system 100 in which latencies imposed by these processes are quantified.

Figure 2:
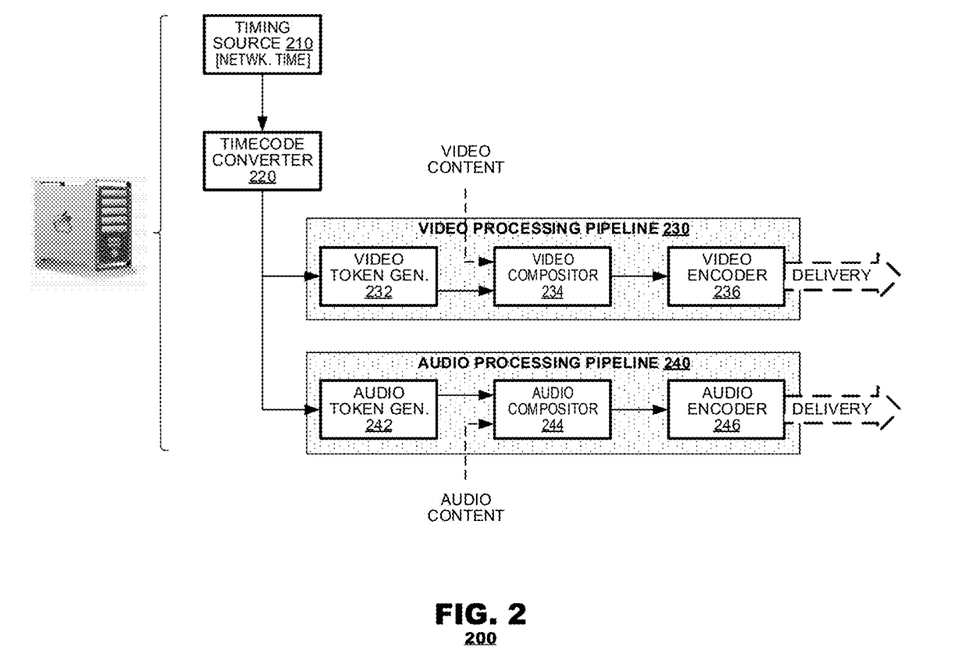
FIG. 2 illustrates functional block diagram of a source device, according to aspects of the present disclosure.

FIG. 2 illustrates a functional block diagram of a source device 200 according to an aspect of the present disclosure. The source device 200 may find an application as the source device 110 in the system 100 illustrated in FIG. 1. The source device 200 may include: a timing source 210, a timecode converter 220, a video processing pipeline 230, and an audio processing pipeline 240. The timing source 210 may provide timing information to the timecode converter 220, which may generate timecodes therefrom. Timing information may be derived from "wall clock" time provided by a network protocol. The video processing pipeline 230 may integrate the timecodes into video content and may output video content from the device 200. Similarly, the audio processing pipeline 240 may integrate the timecodes into audio content and may output the audio content from the device 200.

The video processing pipeline 230 may include a video token generator 232, a video compositor 234, and a video encoder 236. The video token generator may generate visual content, a visual token, representing the timecode received from the timecode converter 220. The video compositor may integrate the visual token into video content received from an external source. The video encoder 236 may apply video coding operations to the resultant video and may output the coded video from the source device 200.

Exemplary processing operations performed by a video encoder 236 may include motion-compensated predictive coding such as by those defined the ITU-T H.264, H.265 coding specifications (or the predecessor specifications), stream assembly, segmentation and packetization, and buffering for transmission (steps not shown).

The audio processing pipeline 240 may include an audio token generator 242, an audio compositor 244, and an audio encoder 246. The audio token generator may generate an audio representation of the timecode received from the timecode converter 220 as an audio token. The audio compositor may integrate the audio token into audio content received from an external source. The audio encoder 246 may apply audio coding operations to the resultant audio and may output the coded audio from the source device 200.

Exemplary processing operations performed by an audio encoder 246 may include those performed for the MP3, Vorbis, AAC and/or Opus coders.

As can be seen from FIG. 2, timecodes representing common timing information may be input both to a video processing pipeline 230 and an audio pipeline 240, may be integrated into content, may be coded, and may be output from the source device 200. It is expected that the coding operations performed by the video encoder 236 and the audio encoder 246 will match coding operations performed by video encoders and audio encoders when the source device 200 is used for runtime applications. In this manner, the timecode information created by the source device 200 when operating in the configuration shown in FIG. 2 will be subject to video coding and audio coding operations that match a runtime processing environment.

Figure 3:
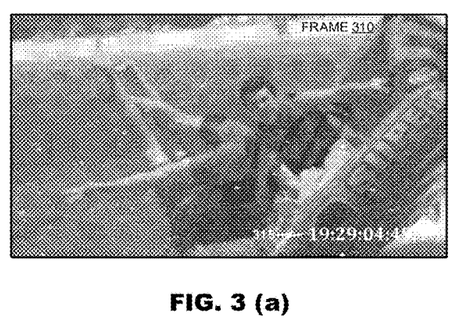
FIG. 3(a) illustrates an exemplary frame on which an exemplary token is overlaid, according to aspects of the present disclosure.
FIG. 3(b) illustrates an exemplary frame with an exemplary visual token embodied as a QR code, an exemplary countdown leader, and an exemplary panel containing random noise, according to aspects of the present disclosure.

FIG. 3 illustrates exemplary tokens that may be used consistent with aspects of the disclosure presented herein. FIG. 3(a) illustrates an exemplary frame 310 on which a first token is overlaid. In this example, the visual token appears as a watermark 315, a textual timecode overlaid on top of visual content from another source. In other aspects, imperceptible watermarks may be applied so as not to disturb perceived quality of the externally-supplied visual content when consumed by human viewers. The imperceptible watermarks may be perceived as noise to human viewers but may be identified through image analyses performed by scan devices 140 (FIG. 1). When the source device 200 of FIG. 2 is adapted to provide watermarks as shown in FIG. 3(a), the video token generator 232 may be provided as a watermark generator, providing either an overlaid time code 315 as shown in FIG. 3(a) or an imperceptible watermark, depending on the application. In this aspect, the video compositor 234 may merge the video watermark content (output of the video token generator 232) with externally-supplied content.

FIG. 3(b) illustrates an exemplary frame 320 with a visual token 322 embodied as a QR code. The QR code 322 may represent timing information generated by the timing source 121 (in this example "19:29:04:49;1"). The frame 320 also includes other content elements representing a countdown leader 324, and a panel 326 containing random noise. Additionally, and as desired, time elements may be contained within the frame content. When the source device 200 of FIG. 2 is adapted to provide a QR code such as shown in FIG. 3(b), the video token generator 232 may be provided as a QR-code generator.

The principles of the present invention find application with other video tokens. For example, video tokens may be generated as Gaussian sequence watermarks or gray scale watermarks. Moreover, transparent watermarks or steganographic watermarks may be applied to reduce perceptual artifacts that the video tokens otherwise may create.

FIG. 3(b) demonstrates an aspect of the present disclosure wherein the patterns 322, 324, 326 that are rendered into frame 320 may not be integrated into an external (consumer-oriented) video content. Thus, in one aspect, it is sufficient for a video compositor 234 (FIG. 2) to generate frames of video having only the token. In other aspects, a compositor 234 may integrate video content of the token with synthetic-generated image content. Such computer-generated image content may have sufficiently high frequency distributions to induce the video encoder 236 to expend processing resources that are similar to processing load(s) that it would encounter to code consumer-oriented video. In this manner, the video may "stress test" the video encoder 236 in a manner that simulates its runtime use.

Audio tokens may be generated both for use cases where consumer-oriented audio is to be presented by audio devices and for other use cases where consumer-oriented audio is not desired. For example, a spread spectrum audio watermark may be integrated with audio content, which may have a character that does not disturb a consumer's perception of the audio but can be detected and analyzed by computer analysis tools that employ pseudo-noise spread spectrum decoding. In an aspect where consumer-oriented audio is not to be conveyed, audio tokens may be generated as linear time code (LTC) signals.

Figure 4:
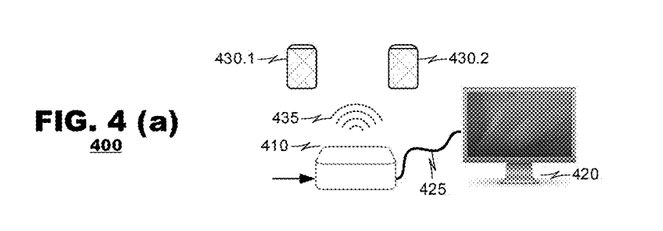
FIG. 4(a) illustrates a rendering system, according to aspects of the present disclosure.
FIG. 4(b) illustrates processing components of a rendering system, according to aspects of the present disclosure.

FIG. 4 illustrates a rendering system 400 that may find application with aspects of the present disclosure. As discussed, rendering systems 400 are expected to vary considerably across a consumer population that consumes video from a source device 110 (FIG. 1) and, therefore, it is not possible to discuss configurations of all possible rendering systems for which the techniques discussed herein will be used. The configuration illustrated in FIG. 4, however, demonstrates sources of some possible delays that may arise when rendering audio and video content.

As illustrated in FIG. 4(*a*), the rendering system 400 may include a media player 410 that is provided in communication with a display device 420 via, for example, a wired communication fabric 425, and in communication with speakers 430.1, 430.2 via, for example, a wireless communication fabric 435. For example, the media player 410 may be provided as a micro-console, a set top box or other communication equipment that receives media content from a network source 130 (FIG. 1) and distributes component content to other devices. The display device may be a high-definition or ultra-high definition display device coupled to the media player 410 by, for example, an HDMI or a DisplayPort connection. The speakers 430.1, 430.2 may connect to the media player 410 by, for example, a Bluetooth or WiFi communication link. HDMI, DisplayPort, Bluetooth, and WiFi communication paths each involve different processing than the others, and each imposes its own latency on distribution of content differently than the other.

Although FIG. 4(*a*) illustrates a single display device 420 and a pair of speakers 430.1, 430.2 in the exemplary system, other configurations may distribute video to multiple display devices (not shown), and to a smaller or larger number of speakers than illustrated. Moreover, depending on system configuration, a player 410 may distribute audio and video content to a single device (such as a display), while distributing component content (say, rear channel audio) to other speaker devices. The number of displays 420 and speakers 430.1, 430.2 are subject only to user configuration requirements. And, of course, other configurations may integrate the media player 410 into any of the other devices 420, 430.1, 430.2.

FIG. 4(*b*) illustrates processing components that may find application in a rendering system such as illustrated in FIG. 4(*a*). A media player 410 may possess a video decoder 440 and one or more video rendering pipelines 450. The video decoder 440 may decode coded video data and may output the decoded video to the video rendering pipeline(s) 450. The video rendering pipelines 450 may possess a communication fabric 452 over which the video output from the video decoder 440 is supplied to the display device, a display rendering processing system 454, and a display panel 456. Different display devices may apply different processes by their respective processing systems 454, which may include color conversions, brightness conversions, frame rate alterations, frame resolution alterations, filtering and other processing operations designed to tailor the input video to characteristics of the display device. The display panel 456 represents a surface of the display device on which video is displayed.

A media player 410 may possess an audio decoder 460 and one or more audio rendering pipelines 470. The audio decoder 460 may decode coded audio data and may output the decoded audio to the audio rendering pipeline(s) 470. The audio rendering pipelines 470 may possess a communication fabric 472 over which audio output from the audio decoder 460 is supplied to the speaker device, an audio rendering processing system 474, and a speaker 476. Different devices may apply different processes by their respective processing systems 474, which may include volume control, spectral modifications, audio filtering, spatialization, stereo separation, beam forming and other processing operations designed to tailor the input audio to characteristics of the speaker. The speaker 476 represents hardware components of the speaker device that outputs audio from the speaker device.

In an aspect, a media player 410 may possess a local video token generator 480 and an audio token generator 490. In this aspect, media streams need not have tokens embedded in their content as illustrated in FIG. 1. Instead, tokens may be added to video content and to audio content by the media player 410. A video token generator 480 may respond to timestamps present in a video stream from sources such as a video coder 114 (FIG. 1), and it may generate video tokens based on content of those timestamps. The video token generator may insert the video tokens into the video stream and may input the resultant video to a video rendering pipeline 450. Similarly, an audio token generator 490 may respond to timestamps present in an audio stream from sources such as an audio coder 115 (FIG. 1) and it may generate audio tokens based on content of those timestamps. The audio token generator 490 may insert the audio tokens into the audio stream and may input the resultant audio to an audio rendering pipeline 470.

For example, testing of an audio rendering pipeline 470 may be performed in a manner in which audio tokens generated from timestamps in an audio source are interleaved into audio that is fed to one of the audio rendering pipelines 470. Such a "blank-and-burst" may assist diagnoses of timing issues in one such audio rendering pipeline.

In an aspect, video tokens may be placed in video content in a layered relationship with respect to other video content elements, which may provide control over whether the video tokens will be displayed by a display device. In an aspect, a compositor, e.g., of the video token generator 480, may control display of a video token responsive to an externally-supplied control signal. For example, a device operator may place a rendering system 400 in a diagnostic mode at which time the compositor 480 may cause the video token to be included in video data output to the display device(s) 420 as above.

In another aspect, audio tokens may be placed in audio content in a layered relationship with respect to other audio content elements, which may provide control over whether the audio tokens will be displayed by a display device. In an aspect, a compositor, e.g., of the audio token generator 490, may selectively control output of the audio token responsive to an externally-supplied control signal. Again, a device operator may place a rendering system 400 in a diagnostic mode at which time the compositor 490 may cause the audio token to be included in audio data output to the display device(s) 420.

Figure 5:
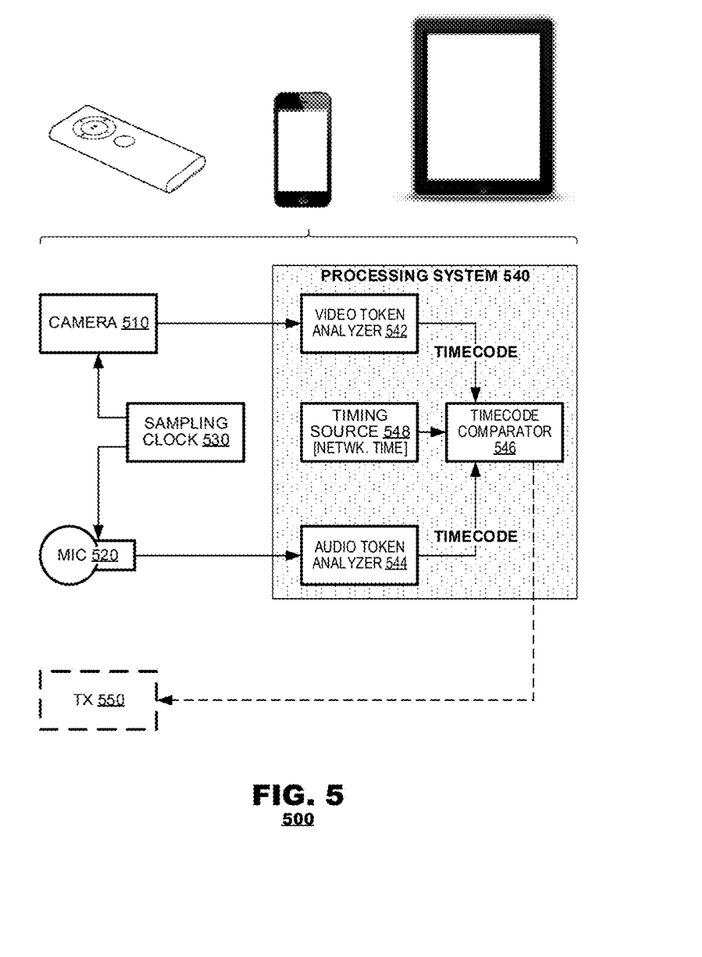
FIG. 5 illustrates block diagram of a scanning device, according to aspects of the present disclosure.

FIG. 5 illustrates a scanning device 500 according to an aspect of the present disclosure. The scanning device 500 may include a camera 510 and a microphone 520, both may operate under control of a sampling clock 530. The scanning device 500 may include a processing system 540 that may include a video token analyzer 542, an audio token analyzer 544, a timecode comparator 546, and (as desired) a timing source 548.

The camera 510 may capture video, output by a display panel of a rendering device (FIG. 4), including a visual token displayed thereon. The camera 510 may capture video at or above the Nyquist rate measured with respect to the expected rate of change of the visual token (e.g., at least twice the refresh rate of the display at which the token is displayed). The captured video may be output to the video token analyzer 542, which may detect token(s) from within the captured video content and may generate timecodes therefrom.

The microphone 520 may capture audio output from a speaker device (FIG. 5), including an audio token contained therein. The microphone 520 may capture audio at or above the Nyquist rate measured with respect to the expected rate of change of the audio token (e.g., at least twice the rate of change of the token). The captured audio may be output to the audio token analyzer 544, which may detect token(s) from within the captured audio content and generate timecodes therefrom.

The timecode comparator 546 may analyze the timecodes output from the video token analyzer 542, the audio token analyzer 544 or both, to quantify propagation delay(s) through the source 110 and the rendering device 120 (FIG. 1). Aspects disclosed herein include several analyses of the detected timecodes.

In a first analysis, the timecode comparator 546 may compare timecodes from the video token analyzer 542 to timecodes from the audio token analyzer 544 to quantify relative delays between the video delivery path, defined by a source device 110 and a rendering device 120 (FIG. 1), and the corresponding audio delivery path defined by the same devices.

In a second analysis, the timecode comparator 546 may compare a timecode output from the video token analyzer 542 to a timing reference provided by a timing source 548 to quantify overall processing delay imposed by the video delivery path defined by a source device 110 and a rendering device 120 (FIG. 1). In this aspect, the timing source 548 and a timing source 210 of the source device 200 (FIG. 2) may be synchronized to each other. They may synchronize themselves to a network timing reference provided by, for example, the Network Time Protocol (NTP).

In a third analysis, the timecode comparator 546 may compare a timecode output from the audio token analyzer 544 to a timing reference provided by a timing source 548 to quantify overall processing delay imposed by the audio delivery path defined by a source device 110 and a rendering device 120 (FIG. 1). Here, again, the timing source 548 and a timing source 210 of the source device 200 (FIG. 2) may be synchronized to each other. They may synchronize themselves to a network timing reference provided by, for example, the Network Time Protocol (NTP).

These techniques may form the basis of diagnostic operations to be performed on rendering applications when an aberrant operation behavior is detected. For example, if a viewer observed "lip-sync" issues between displayed video and rendered audio, the foregoing techniques may be applied to quantify timing differences between the video path and the audio path, and take corrective measures (for example, by introducing latency into one or more of the paths until synchronization is established). Similarly, rendering delays may be observed between otherwise paired video devices and/or paired audio devices. Here, again, path-specific delays may be quantified by the foregoing techniques, and corrective measure may be taken. The scanning device architecture illustrated in FIG. 5 may be provided in a variety of commercial applications. For example, a scanning device 500 may be embodied within a remote control, which is provided for one of the devices 510, 520, 530.1, 530.2 illustrated in FIG. 5. In this aspect, it may be convenient to embody the scanning device within a remote control. Such a remote control of a media player 410, for example, may employ the diagnostic operations described herein to quantify propagation delay(s) of different video paths with respect to different audio paths, which may be transmitted to the media player 410 (via a transmitter 550) to tune the propagation paths to each other. If, for example, it is determined that one pipeline (say 450 (FIG. 4(*b*))) imposes a 50 ms delay with respect to another pipeline 470, the media player 410 may add a corresponding 50 ms delay to the second pipeline 470 to improve synchronization between them.

In another application, media distribution organizations may employ the timecode analysis described herein to quantify processing delays imposed by their distribution systems. As discussed, the video coding and audio coding operations performed by source devices may impose processing delays. Personnel may employ a scanning device to compare the times at which timecodes are output from rendering devices 520, 530.1, 530.2 to times at which video and audio was admitted to source devices 110 (FIG. 1) to quantify the overall endpoint-to-endpoint latency of media distribution. For such tasks, it is expected that capturing timing information as video and/or audio is output from their respective presentation devices will provide better estimates of propagation delay than would measurements performed internally by, for example, a media player 410. A media player 410 might not capture delays imparted by video and/or audio processing pipelines 450, 470 and, as discussed above, that add additional delays to media rendering that may differ between the pipelines 450, 470.

Figure 6:
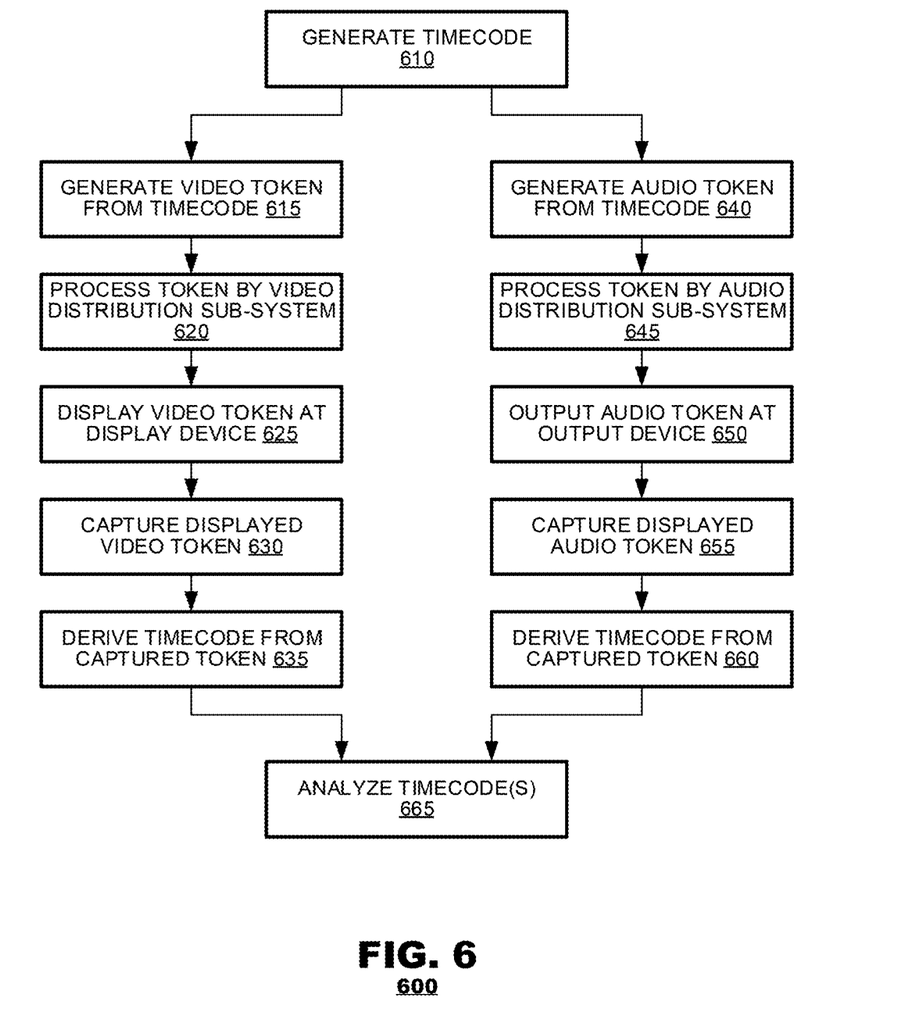
FIG. 6 illustrates a method for quantifying propagation delay in a media distribution system, according to aspects of the present disclosure.

FIG. 6 illustrates a method 600 according to an aspect of the present discussion. The method 600 may begin by generating a timecode (box 610). The method 600 may generate a video token from the timecode (box 610) and process the video token by a video distribution sub-system (box 620). The method 600 may display the video token at a display device (box 625) after processing by the video distribution sub-system. The token may be captured (box 630) as it is displayed. The timecode may be derived from the captured data representing the displayed token (box 635).

In a parallel operation, the method 600 may generate an audio token from the timecode (box 640) and process the audio token by an audio distribution sub-system (box 645). The method 600 may output the audio token at an output device (box 650) after processing by the audio distribution sub-system. The audio token may be captured (box 655) as it is output. The timecode may be derived from the captured audio data representing the output audio token (box 660). The method 600 may analyze the timecodes (box 665) to quantify delays imposed by the video distribution sub-system, the audio distribution sub-system, or both.

Several extensions find application with the techniques disclosed hereinabove in FIGS. 1-6. In a first exemplary application, in addition to providing timing information, the tokens may include frame number identifiers. Frame numbers typically advance in sequential order over the course of a media item. A processing system 540 that analyzes such tokens may extract the frame numbers therefrom and identify from the frame numbers whether frames were lost in delivery. Lost frames may arise from communication errors or by intentional processing (such as when a display device reduces frame rate before rendering).

In a second exemplary application, tokens may be augmented to contain information regarding streams being used in adaptive streaming systems. Adaptive streaming systems make available multiple copies ("streams") of a media item, which are coded at different bitrates. Oftentimes, rendering devices will select a stream for download and for rendering based on local estimate of operating condition (such as the available bandwidth and/or the available processing resources) and, if operating condition changes, the devices may change to a different stream, download it, and render it. Tokens may contain information about the streams in which they are contained, which may be collected by a processing system 540 for analysis. Thus, stream switching behavior of a rendering device may be monitored.

In a third exemplary application, tokens may be designed to include other information regarding the source information from which the tokens were generate. Such information may include: frame rate of the video, a source URL from which the video was obtained, dynamic range of the content and the display device, displayed dimension, source dimensions, codecs used to generate the media stream, and the like.

We claim:

1. A method of quantifying a propagation delay in a media distribution system, comprising:
   receiving a media stream at the media distribution system,
   determining a local timing reference synchronized to a remote timing reference for the received media stream,
   capturing a rendered output of the media stream from an output device of the media distribution system;
   detecting a token within the captured output,
   deriving, from the detected token, a timecode according to the remote timing reference; and
   determining the propagation delay of the media distribution system from a comparison of the local timing reference to the derived timecode.

2. The method of claim 1, wherein the determining comprises comparing a time represented by the derived timecode to a network time at the time of the capturing.

3. The method of claim 1,
   wherein the capturing, detecting, and deriving are performed for both a video output of the media distribution system and an audio output of the media distribution system, and
   the determining comprises comparing the timecode derived from the detected token within the captured video output to the timecode derived from the detected token within the captured audio output.

4. The method of claim 1, further comprising communicating to the media distribution system the determined propagation delay.

5. The method of claim 1, wherein the output is video data, and the token is a QR code.

6. The method of claim 1, wherein the output is video data, and the token is an imperceptible watermark.

7. The method of claim 1, wherein the output is audio data, and the token is an LTC code.

8. The method of claim 1, wherein the output is audio data, and the token is a spread spectrum watermark.

9. A method of quantifying a propagation delay in a media distribution system, comprising:
   generating a token representing a source timecode according a source reference time of a source clock at a first point in the media distribution system;
   embedding the token in a content stream of the media distribution system;
   processing the content by the media distribution system;
   rendering the token by an output device of the media distribution system;
   capturing, at a scanning device, the rendered token as content rendered by the output device and determining a capture time according to a rendering reference time of a rendering clock at the scanning device, wherein the source clock and the rendering clock are synchronized;
   deriving the source timecode from data of the captured token; and
   determining the propagation delay from a comparison of the source timecode the capture time.

10. The method of claim 9,
    wherein the reference time is a first network time determined by a network in which the media distribution system operates, and
    the determining comprises comparing a time represented by the derived timecode to a second network time determined at the time of the capturing.

11. The method of claim 9,
    wherein the embedding, processing, outputting, capturing and deriving are performed for both a video distribution sub-system of the media distribution system and an audio distribution sub-system of the media distribution system, and
    the determining comprises comparing the timecode derived from a captured video token to the timecode derived from a captured audio token.

12. The method of claim 9, further comprising altering a delay characteristic of the media distribution system based on the determined propagation delay.

13. A media distribution system, comprising:
    a video token generator generating a video token indicating a timing reference supplied by a local timing source synchronized to a remote timing source;
    a video coder to code a visual indicator of the video token;
    an audio token generator generating an audio token indicating the local timing reference; and
    an audio coder to code an audio indicator of the audio token.

14. The system of claim 13, wherein the video token is a QR code.

15. The system of claim 13, wherein the video token is an imperceptible watermark.

16. The system of claim 13, wherein the audio token is an LTC code.

17. The system of claim 13, wherein the audio token is a spread spectrum watermark.

18. The system of claim 13, further comprising a video compositor that blends the video token with other video content.

19. The system of claim 13, further comprising an audio compositor that blends the audio token with other audio content.

20. A media distribution system, comprising:
- a video token generator generating a video token indicating a timing reference supplied by a local timing source synchronized to a remote timing source;
- a video rendering pipeline to render a video stream, the pipeline having an input for the video token;
- an audio token generator generating an audio token indicating the local timing reference; and
- an audio rendering pipeline to render an audio stream, the pipeline having an input for the audio token.

21. A method of quantifying a propagation delay in a media distribution system, comprising:
- capturing an analog audio output at a sample time from an audio output device of the media distribution system;
- detecting an audio token within the captured audio output,
- deriving an audio timecode from the detected audio token;
- capturing an analog video output at the same sample time from a video output device of the media distribution system;
- detecting a video token within the captured video output,
- deriving a video timecode from the detected video token; and
- comparing propagation delays by comparing the audio timecode and the video timecode.

22. The method of claim 21, further comprising synchronizing the analog audio output from the media distribution system with the analog video output from the media distribution system based on the comparing.

\* \* \* \* \*